US008738787B2

(12) United States Patent
Cobb et al.

(10) Patent No.: US 8,738,787 B2
(45) Date of Patent: May 27, 2014

(54) AD SERVER INTEGRATION

(75) Inventors: Jonathan W. Cobb, Piedmont, CA (US); David Rowley, Benicia, CA (US); Scott Anderson, San Francisco, CA (US); Abbas Mahyari, Newark, CA (US)

(73) Assignee: Limelight Networks, Inc., Tempe, AZ (US)

( * ) Notice: Subject to any disclaimer, the term of this patent is extended or adjusted under 35 U.S.C. 154(b) by 183 days.

(21) Appl. No.: 12/770,600

(22) Filed: Apr. 29, 2010

(65) Prior Publication Data
US 2010/0235468 A1 Sep. 16, 2010

Related U.S. Application Data

(63) Continuation-in-part of application No. 11/406,675, filed on Apr. 18, 2006.

(60) Provisional application No. 61/238,100, filed on Aug. 28, 2009, provisional application No. 60/673,128, filed on Apr. 20, 2005.

(51) Int. Cl.
*G06F 15/16* (2006.01)
*H04N 7/025* (2006.01)
*G06Q 30/00* (2012.01)

(52) U.S. Cl.
USPC ..... 709/229; 709/227; 705/14.49; 705/14.58; 725/32; 725/35

(58) Field of Classification Search
USPC ............ 709/227, 229; 725/32–36; 705/14.49, 705/14.58
See application file for complete search history.

(56) References Cited

U.S. PATENT DOCUMENTS

| 4,671,772 A | 6/1987 | Slade et al. |
| 4,863,384 A | 9/1989 | Slade |
| 5,099,422 A | 3/1992 | Foresman et al. |

(Continued)

FOREIGN PATENT DOCUMENTS

WO WO 2007/051129 A2 5/2007

OTHER PUBLICATIONS

"Podbridge", found online at http://www.podbridge.com/home/index.php?action=show_about, visited Dec. 8, 2006, 2 pages.

(Continued)

*Primary Examiner* — Rupal Dharia
*Assistant Examiner* — Joe Chacko
(74) *Attorney, Agent, or Firm* — Kilpatrick Townsend & Stockton LLP

(57) ABSTRACT

A method and system for providing a content object is disclosed with an in-stream ad unit inserted into the content object for a content object player. The content object is audio and/or video. A media services platform (MSP) knows of one or more in-stream slots in the content object where in-stream ad units may be placed. The MSP queries a display ad server (DAS) to specify the in-stream ad unit, however the DAS does not natively support in-stream ad units in this embodiment. The MSP maps one or more in-stream slots in the content object to corresponding display ad locations. The MSP places the in-stream ad unit into the slot of the content object to create a processed content object. The MSP optionally transcodes the processed content object. The processed content object is downloaded or streamed to the content object player.

18 Claims, 9 Drawing Sheets

(56) References Cited

U.S. PATENT DOCUMENTS

| | | | |
|---|---|---|---|
| 5,550,735 | A | 8/1996 | Slade et al. |
| 5,768,680 | A | 6/1998 | Thomas |
| 5,802,599 | A | 9/1998 | Cabrera et al. |
| 5,815,689 | A | 9/1998 | Shaw et al. |
| 6,115,035 | A | 9/2000 | Compton et al. |
| 6,216,152 | B1 | 4/2001 | Wong et al. |
| 6,236,009 | B1 | 5/2001 | Emigh et al. |
| 6,269,275 | B1 | 7/2001 | Slade |
| 6,654,814 | B1 | 11/2003 | Britton et al. |
| 6,704,930 | B1 | 3/2004 | Eldering et al. |
| 6,792,463 | B1 * | 9/2004 | Lamberton et al. ............ 709/227 |
| 6,950,804 | B2 | 9/2005 | Strietzel |
| 7,107,582 | B2 | 9/2006 | Clarke et al. |
| 7,149,958 | B2 | 12/2006 | Landsman et al. |
| 7,165,036 | B2 | 1/2007 | Kruk et al. |
| 7,165,218 | B1 | 1/2007 | Hancock |
| 7,281,008 | B1 | 10/2007 | Lawrence et al. |
| 7,373,599 | B2 * | 5/2008 | McElfresh et al. ............ 715/210 |
| 7,571,183 | B2 | 8/2009 | Renshaw et al. |
| 7,574,499 | B1 | 8/2009 | Swildens et al. |
| 7,640,296 | B2 | 12/2009 | Fuchs et al. |
| 7,676,590 | B2 * | 3/2010 | Silverman et al. ............ 709/231 |
| 7,747,465 | B2 | 6/2010 | Srinivasan et al. |
| 7,761,554 | B1 | 7/2010 | Hild et al. |
| 7,992,165 | B1 * | 8/2011 | Ludewig et al. ................ 725/32 |
| 2001/0037314 | A1 | 11/2001 | Ishikawa |
| 2002/0007494 | A1 * | 1/2002 | Hodge ............ 725/109 |
| 2002/0010798 | A1 | 1/2002 | Ben-Shaul et al. |
| 2002/0042738 | A1 | 4/2002 | Srinivasan et al. |
| 2002/0065912 | A1 | 5/2002 | Catchpole et al. |
| 2003/0001846 | A1 | 1/2003 | Davis et al. |
| 2003/0012409 | A1 | 1/2003 | Overton et al. |
| 2003/0058866 | A1 | 3/2003 | Kitayama |
| 2003/0097443 | A1 | 5/2003 | Gillett et al. |
| 2003/0101412 | A1 | 5/2003 | Eid |
| 2003/0129956 | A1 | 7/2003 | Virolainen |
| 2003/0149937 | A1 | 8/2003 | McElfresh et al. |
| 2003/0149938 | A1 | 8/2003 | McElfresh et al. |
| 2003/0191816 | A1 | 10/2003 | Landress et al. |
| 2004/0003398 | A1 | 1/2004 | Donian et al. |
| 2004/0019497 | A1 | 1/2004 | Volk et al. |
| 2004/0019675 | A1 | 1/2004 | Hebeler et al. |
| 2004/0103024 | A1 | 5/2004 | Patel et al. |
| 2004/0107169 | A1 | 6/2004 | Lowe |
| 2004/0117427 | A1 | 6/2004 | Allen et al. |
| 2004/0125140 | A1 | 7/2004 | Bell et al. |
| 2004/0186894 | A1 | 9/2004 | Jhingan et al. |
| 2004/0200337 | A1 | 10/2004 | Abe et al. |
| 2004/0210948 | A1 | 10/2004 | Jin et al. |
| 2004/0225562 | A1 | 11/2004 | Turner |
| 2005/0060229 | A1 * | 3/2005 | Riedl et al. ............ 705/14 |
| 2005/0080633 | A1 | 4/2005 | Lueck et al. |
| 2005/0081239 | A1 | 4/2005 | Makowski et al. |
| 2005/0091111 | A1 | 4/2005 | Green et al. |
| 2005/0137958 | A1 | 6/2005 | Huber et al. |
| 2005/0149880 | A1 | 7/2005 | Postrel |
| 2005/0188403 | A1 | 8/2005 | Kotzin |
| 2005/0273388 | A1 * | 12/2005 | Roetter ............ 705/14 |
| 2006/0010390 | A1 | 1/2006 | Guido et al. |
| 2006/0021057 | A1 | 1/2006 | Risan et al. |
| 2006/0053468 | A1 | 3/2006 | Sudoh et al. |
| 2006/0149624 | A1 * | 7/2006 | Baluja et al. ............ 705/14 |
| 2006/0195859 | A1 | 8/2006 | Konig et al. |
| 2006/0242201 | A1 * | 10/2006 | Cobb et al. ............ 707/104.1 |
| 2007/0112762 | A1 | 5/2007 | Brubaker |
| 2007/0180066 | A1 | 8/2007 | Sherwood et al. |
| 2007/0204310 | A1 * | 8/2007 | Hua et al. ............ 725/88 |
| 2007/0245388 | A1 * | 10/2007 | Shen ............ 725/87 |
| 2008/0091767 | A1 | 4/2008 | Afergan et al. |
| 2008/0102947 | A1 | 5/2008 | Hays et al. |
| 2009/0006643 | A1 * | 1/2009 | Lee ............ 709/231 |
| 2009/0030802 | A1 | 1/2009 | Plotnick et al. |
| 2010/0042747 | A1 * | 2/2010 | Hascalovici et al. ......... 709/246 |
| 2010/0082439 | A9 | 4/2010 | Patel et al. |

OTHER PUBLICATIONS

U.S. Appl. No. 11/406,675, Final Office Action dated Apr. 27, 2009, 50 pages.

U.S. Appl. No. 11/406,675, Office Action dated Nov. 28, 2008, 35 pages.

U.S. Appl. No. 11/406,675, Office Action dated May 25, 2010, 47 pages.

U.S. Appl. No. 11/406,675, Office Action dated Sep. 15, 2009, 45 pages.

Govani, "Dictionary of marketing communications", 2004, Sage Publications, 1 page.

Green, "Adding Streaming Media to Your Web Site with Windows Media Technologies", 1999, Microsoft Corporation, 1 page.

U.S. Appl. No. 11/406,675, Final Office Action dated Dec. 21, 2010, 62 pages.

Govoni, Norman A. P., "Dictionary of Marketing Communications," Screen shot Dec. 21, 2010, 2004, 1 page, Sage Publications.

Green, John, "Adding Streaming Media to Your Web Site with Windows Media Technologies," Microsoft Corporation, Retrieved from http://technet.microsoft.com/en-us/library/bb676136.aspx, Feb. 24, 1999, 13 pages.

Plotnick, Michael A., "Personal Video Recorder (PVR) Market Overview and Advertising Opportunities," U.S. Appl. No. 60/281,037, Apr. 3, 2001, 25 pages.

U.S. Appl. No. 11/406,675, Final Office Action dated Mar. 16, 2012, 81 pages.

U.S. Appl. No. 11/406,675, Final Office Action dated Dec. 21, 2010, 63 pages.

U.S. Appl. No. 11/406,675, Office Action dated Jul. 20, 2011, 73 pages.

U.S. Appl. No. 12/770,600, Office Action dated Jan. 6, 2012, 10 pages.

U.S. Appl. No. 11/406,675, Notice of Allowance mailed Aug. 17, 2012, 12 pages.

U.S. Appl. No. 13/245,786, Office Action mailed Jul. 6, 2012, 13 pages.

\* cited by examiner

AD SERVER INTEGRATION

This application claims the benefit of and is a continuation-in-part of co-pending U.S. application Ser. No. 11/406,675 filed on Apr. 18, 2006, which claims priority to U.S. Provisional Application Ser. No. 60/673,128 filed on Apr. 20, 2005, which is hereby expressly incorporated by reference in its entirety for all purposes.

This application claims the benefit of and is a non-provisional of U.S. Provisional Application Ser. No. 61/238,100 filed on Aug. 28, 2009, which is hereby expressly incorporated by reference in its entirety for all purposes.

BACKGROUND

This disclosure relates in general to advertizing ("ad") serving and, but not by way of limitation, to insertion of in-stream ad units into audio or video content objects.

Display ad servers (DAS) provide a service that allows placement of display ads in a wide range of web sites. A display ad unit is defined herein to be an ad that is placed in a web page (banner ads, text ads, etc) and may include static (e.g., text, graphics and/or pictures) or dynamic content (e.g., audio, video, animation, and/or slideshow content). A web page may contain one or more tags that link to the DAS such that the DAS can supply a variable display ad when the web page is rendered. For example, banner slots have links associated with them that query the DAS for display ad units for embedding in the rendered web page. A display ad campaign is defined that will place a certain number of impressions of various display ad units at specified web sites or categories of web sites. The DAS tracks the number of impressions by receiving requests for display ad units and returning the display ad unit directly or indirectly through another server.

A DAS is not used for placement of dynamic content ads in audio or video ("AV") content objects (hereinafter an "in-stream ad unit"). A content object is a media file that is continuously streamed or downloaded and includes in-stream ad units contiguously placed into slots defined in the content object. The content object is played by a media player, set top box, IP TV, a browser, an applet within a browser, etc.

Ad campaigns for conventional display ad units are trafficked by advertizing operations teams. The display ad units are uploaded to or referenced by the DAS, and web sites or groups of sites are targeted by the ad campaign. For example, a banner ad for a dog food product could be sent to or referenced by the DAS, and four pet-specific web sites could be targeted by this ad campaign such that 100,000 impressions of that display ad unit would be delivered to those targeted web sites. A display ad unit may include static ads, animated ads, flash ads, and video and/or audio ads for insertion into predefined banner ad locations of a web page. Advertizing operations teams are familiar with using a DAS to deliver display ads units as part of an ad campaign.

A DAS can specify display ad units that are rendered in a web site by the browser after the browser requests a link to the DAS that was placed in the web page. The ads are separate resources from the web page in which they are placed, typically referenced as an HTML link in the web page. In-stream ads units are inserted into content objects—an operation that cannot be done by the browser or the DAS. Some media players receive a playlist of content objects to aggregate in-stream ad units and content objects for contiguous playback, but in other environments, media players are unable to process a playlist of multiple content objects.

In-stream ad units that are inserted into content objects before streaming to a content object player are done in a static fashion. Unlike the DAS that can dynamically move around display ad units to different sites and/or web pages, in-stream ad units cannot conventionally be placed in that way. Typically, slots for in-stream ad units are filled by providers of the content objects to stream the content object with preset in-stream ad units that are the same for all end users. For example, a web site hosting video would find an advertiser that would provide an in-stream ad unit to embed into a content object that is served from the web site such that all viewers would receive the same ads.

SUMMARY

In one embodiment, a method and system for providing a content object with an in-stream ad unit inserted into the content object for a content object player is disclosed. The content object is audio and/or video. A media services platform (MSP) knows of one or more in-stream slots in the content object where in-stream ad units may be placed. The MSP queries a display ad server (DAS) to specify the in-stream ad unit, however the DAS does not natively support in-stream ad units in this embodiment. The MSP maps one or more in-stream slots in the content object to corresponding display ad locations. The MSP places the in-stream ad unit into the slot of the content object to create a processed content object. The MSP optionally transcodes the processed content object. The processed content object is downloaded or streamed to the content object player.

In one embodiment, a method for providing a content object with an in-stream ad unit inserted into the content object is disclosed, where the content object is audio and/or video. A content request for the content object from a content object player is received at a first location. The content object has a slot configured for insertion of the in-stream ad unit. The content request includes location information that is received at the first location, and identifies where the content object can be requested. An ad request for the in-stream ad unit is sent from the first location to an ad server at a second location, wherein the second location is away from the first location on the Internet. An indication of the in-stream ad unit to insert into the slot is received from the ad server. The in-stream ad unit is retrieved. The content object transmogrified to effect the placement of the in-stream ad unit into the slot of the content object to create a coded content object at the first location. Download or streaming of the coded content object from the first location with the in-stream ad unit placed into the slot is facilitated.

In one embodiment, a media services platform for providing a content object with an in-stream ad unit inserted into the content object is disclosed, where the content object is audio and/or video. The media services platform includes a first interface, a second interface, a computing system and a third interface. The first interface is configured to receive at a first location: a content request for the content object from a content object player, and location information that identifies where a content object can be retrieved. The second interface is configured to send an ad request for the in-stream ad unit from the first location to an ad server at a second location, where the second location is away from the first location on the Internet. The computing system is configured to: process indication of the in-stream ad unit to insert into the slot from the ad server, and automatically place the in-stream ad unit into the slot of the content object to create a coded content object at the first location. The third interface is configured to facilitate download or streaming of the coded content object from the first location with the in-stream ad unit placed into the slot.

In one embodiment, a method for providing a content object with an in-stream ad unit inserted into the content object, where the content object is audio and/or video. A content request for the content object from a content object player is processed at a first location where the content object has a slot configured for insertion of the in-stream ad unit. Location information is processed at the first location that identifies where the content object can be retrieved. An indication of a slot within the content object for insertion of the in-stream ad unit is processed at the first location. An ad request for the in-stream ad unit is sent from the first location to an ad server at a second location, where the second location is away from the first location on the Internet. An indication of the in-stream ad unit to insert into the slot from the ad server is processed. The in-stream ad unit is automatically placed into the slot of the content object to create a coded content object at the first location. Download or streaming of the coded content object from the first location with the in-stream ad unit placed into the slot is facilitated.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
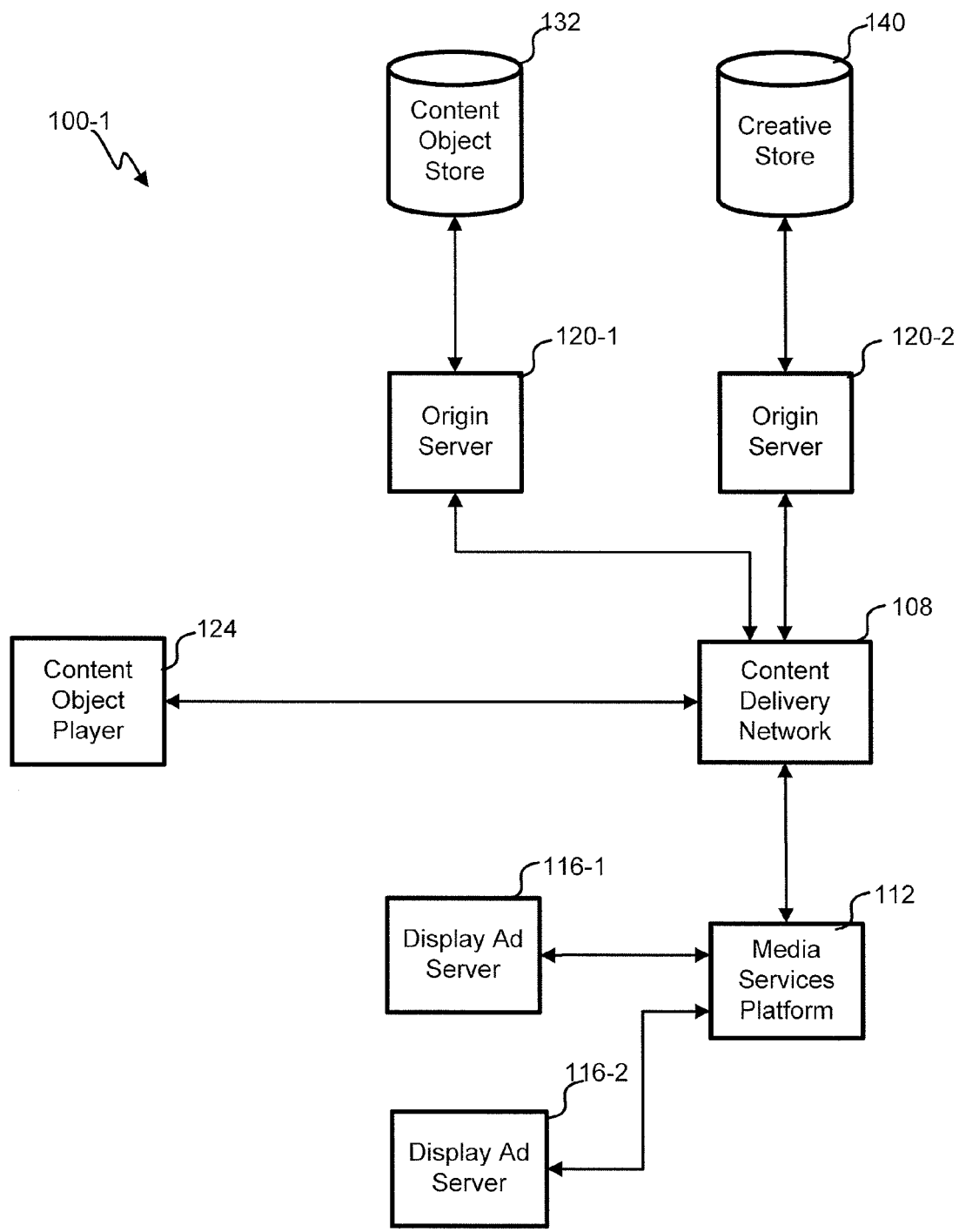
FIGS. 1A, 1B and 1C depict block diagrams of embodiments of a content object delivery system.

Referring initially to FIG. 1A, an embodiment of a content object delivery system 100-1 is shown. A media services platform (MSP) 112 in conjunction with one or more third-party display ad servers (DAS) 116 enable mapping between streamed/downloaded audio/video content objects (hereinafter "content objects") and in-stream ad units. In-stream ad units are inserted into content objects, where the in-stream ad unit could include audio, video, a still picture, a slide show, and/or an animation. Unlike conventional insertion of display ad units into web pages, this embodiment uses third-party DAS(s) 116 that are not designed to natively provide in-stream ad units for placement into content objects.

Although not shown, the various components in this and other block diagrams can be separated by networks that may even include public networks such as the Internet. For example, each DAS 116, the MSP 112, the content object player 124, each origin server, and/or the CDN 108 can be in separate locations coupled together with the Internet, a WAN and/or a LAN. In some cases, blocks can be collocated in the same location and can be integrated together. For example, a single server may perform as the MSP 112 and an origin server 120. The storage blocks 132, 140 are show as being separate, but can be combined or distributed in any fashion.

In this embodiment, the DAS 116 doesn't natively support placement of in-stream ad units within content objects. Requests for display ad units from the MSP 112 are believed to be to populate banner slots in a web page. Instead, the MSP 112 takes the single request for a content object from a content object player 124 and interacts with the one or more DAS 116 to fill slots in the content object with in-stream ad units specified by the one or more DAS 116. The process of preparing a content object with in-stream ad units and optional encoding by the MSP 112 is referred to herein as transmogrify. From the perspective of a DAS 116, the MSP 112 acts like an end user requesting display ad units to fill banner slots in a web page, but the MSP 112 is in fact filling slots in the content object with in-stream ad units. The content object is prepared with the slots filled with the in-stream ad units for return to the content object player 124 in response to the single request for the content object.

Different DAS 116 use different languages and protocols for filling banner slots with display ad units. For example, DoubleClick™ provides an application called DoubleClick™ for Publishers (DFP), Microsoft™ provides Atlas AdManager™ and 24/7 Real Media™ provides Open AdStream™ to serve display ads units dynamically for banner slots in web pages. Web pages have predetermined banner slots for display ad units, and an end user system, typically a web browser, conventionally interacts with the DAS 116 to fill those banner slots as the web page is rendered. The display ad units may invoke a media player to render a content object as part of the web page, but DAS 116 generally has no knowledge or control over the content object or how an in-stream ad unit is placed within the content object. Upon request, the DAS 116 merely provides the display ad unit or points the browser to a location to find the display ad unit. DAS 116 has no appreciation of in-stream ad units for insertion into content objects in this embodiment.

In this embodiment, the DAS 116 is used for providing links to specify in-stream ad units for insertion into content objects that are downloaded or streamed to a content object player 124 for the end user. The DAS 116 maps available in-stream ad units to requests from the MSP 112 to fill slots. The available in-stream ad units are specified to the DAS 116 when the ad campaign is designed. Tracking of the impressions experienced for the in-stream ad units is performed by the DAS 116 to allow metrics for an ad campaign.

The ad request sent from the MSP 112 to the DAS 116 are in the DFP format in this embodiment to indicate the slot to fill by remapping certain variables in the ad request. The DAS 116 responds by specifying an in-stream ad unit to insert into the slot in the content object typically with a link. For example, the link may specify a location that the in-stream ad unit named foo.mov could be retrieved for insertion by the MSP 112 at a mid-roll slot of a content object called video.mpg. In some cases, the DAS 116 may store the in-stream ad unit and provide it directly back to the MSP 112.

In this embodiment, the dimension variable or banner size for display ad units for DFP is repurposed to indicate to the DAS 116 where the slot is located such that the MSP 112 can insert the in-stream ad unit into the slot of the content object. For example, a 1×1 sized display ad unit in DFP is understood by the MSP 112 to indicate that the in-stream ad unit should be placed in a pre-roll slot, which means that the in-stream ad unit is placed at the beginning of the content object. The DAS provides a link to the appropriate in-stream ad unit in response to the request from the MSP 112. The MSP 112 requests the in-stream ad unit specified in the link from the DAS 116 and places the in-stream ad unit into the content object previously requested by the content object player 124. This process is repeated for any remaining the slots to return a content object to the content object player 124 with any number of in-stream ad units. From the single request for a content object by the content object player 124, the content object is returned with the proper in-stream ad units.

This embodiment uses one or more CDNs 108 that may include origin servers 120 and/or caching servers that provide content objects and/or in-stream ad units. This embodiment includes a content object store 132 and a creative store 140 respectively hosted by origin servers 120 of the CDN 108, but other embodiments could rely on the storage in the MSP 112, the DAS 116 and/or elsewhere on the Internet to store content objects and/or in-stream ad units. Instead of preinserting in-stream ad units into the content objects in anticipation of later requests, the MSP 112 in other embodiments may insert in-stream ad units into content objects as they are requested. In-stream ad units are placed into the content object before download or streamlining, but the entire automated editing process may not be complete before download or streaming to the content object player 124 begins.

The content object is provided to the MSP 112 from a content object store 132 in this embodiment. The content objects are accessible from an origin server 120-1 somewhere on the Internet. The origin servers 120 are the original source of content objects and/or in-stream ad units. In this embodiment, the content objects are hosted by the CDN 108. Other embodiments could place the content object store 132 anywhere that is accessible to the MSP 112. The content provider interacts with the CDN 108 to arrange hosting of the content objects to offload some or all of the hosting. Content objects are manually or automatically uploaded to the content object store 132 before requests for delivery.

This embodiment shows an origin server 120-2 hosted by a content delivery network (CDN) 108 that also includes a creative store 140 accessible from another origin server 120-1. In-stream ad units available for placement are stored in the creative store 140. There may be any number of creative stores 140 hosted by a CDN 108 or some other content provider. In this embodiment, the CDN 108 can deliver content objects from the MSP 112 using caching and streaming servers (not shown). Unique URIs, for example, can be used to differentiate various versions of the content object such that the cache supplies the proper in-stream ad unit encoded in appropriate bitrate, format, etc.

Through interaction with the MSP 112 and DAS 116, in-stream ad campaigns can be designed that use the DAS 116 to connect in-stream ad units to content objects for one or more content object players 124. The ad campaign designer specifies in-stream ad units for the ad campaign with the DAS 116 that will be returned by the DAS 116 when content objects are requested from MSP 112. The MSP 112 passes parameters to the DAS 116 that influence which in-stream ad unit links are returned for each slot, and those in-stream ad units are inserted into the content objects by the MSP 112 according to the placement preference. By interaction with the MSP 112, the designer can specify the parameters for the content object and the slot(s) that are available for filling with in-stream unit(s). The DAS 116 chooses the in-stream ad unit for the slot indicated available by the MSP 112.

The DAS 116 is designed to operate with display ad units and has no appreciation of placing in-stream ad units into various slots of content objects. The ad campaign designer interacts with the DAS 116 to specify the location (i.e., the link or URI) of in-stream ad units in the creative store 140 and situations or contexts where those in-stream ad unit might be specified to the MSP 112. Use of the display ad API of the DAS 116 allows this mapping even without native support in the API for in-stream ad units. Specifically, the display ad size is chosen in a unique way such that the MSP 112 can indicate to the DAS 116 the slot in the content object it wants to fill. The DAS 116 receives the display ad size and information characterizing the content object to decide which in-stream ad unit will fill the slot. This technique spoofs the existing API to have a DAS 116 work with in-stream ad units. Other embodiments could use a modified DAS that has an API that appreciates placement of in-stream ad units into various locations of content objects. In any event, the DAS 116 is a third party controlled server at a location other than the MSP 112 and/or CDN 108 that is specifying the in-stream ad unit for a slot or location in the content object on a slot-by-slot basis.

Although embodiments only show a single content object player 124 it is understood that there are a number of content object players 124. The content object player 124 can be any device that plays audio or video content objects, for example, a set top box, a media stream player, a wireless phone, a tablet, a kiosk, a laptop, an Internet radio, a movie theater projector, a video game system, a gaming machine, etc. The content object player 124 could request content for any number of different applications, for example, a web browser, a media player, a podcast application, a music player, an Internet radio application, etc. The content object player 124 requests a particular content object from the MSP 112 using a URI or other mechanism to specify the content object.

The request from the content object player could have parameters or attributes to specify preferred encoding format, bitrate, sampling rate, error correction, encryption preferred types of advertizing or other parameters used by the MSP 112 to deliver the content objects and in-stream ad units. Other embodiments could imply the parameters or attributes when not express from the request by knowing information about the content object player 124. From the single request or URI from the content object player 124, the MSP 112 transmogrifies the content object to produce a content object that has in-stream ad units inserted along with possible other encoding. In this embodiment, the content object player 124 is not capable of transmogrifying and simply requests a content object that it plays.

Figure 1B:
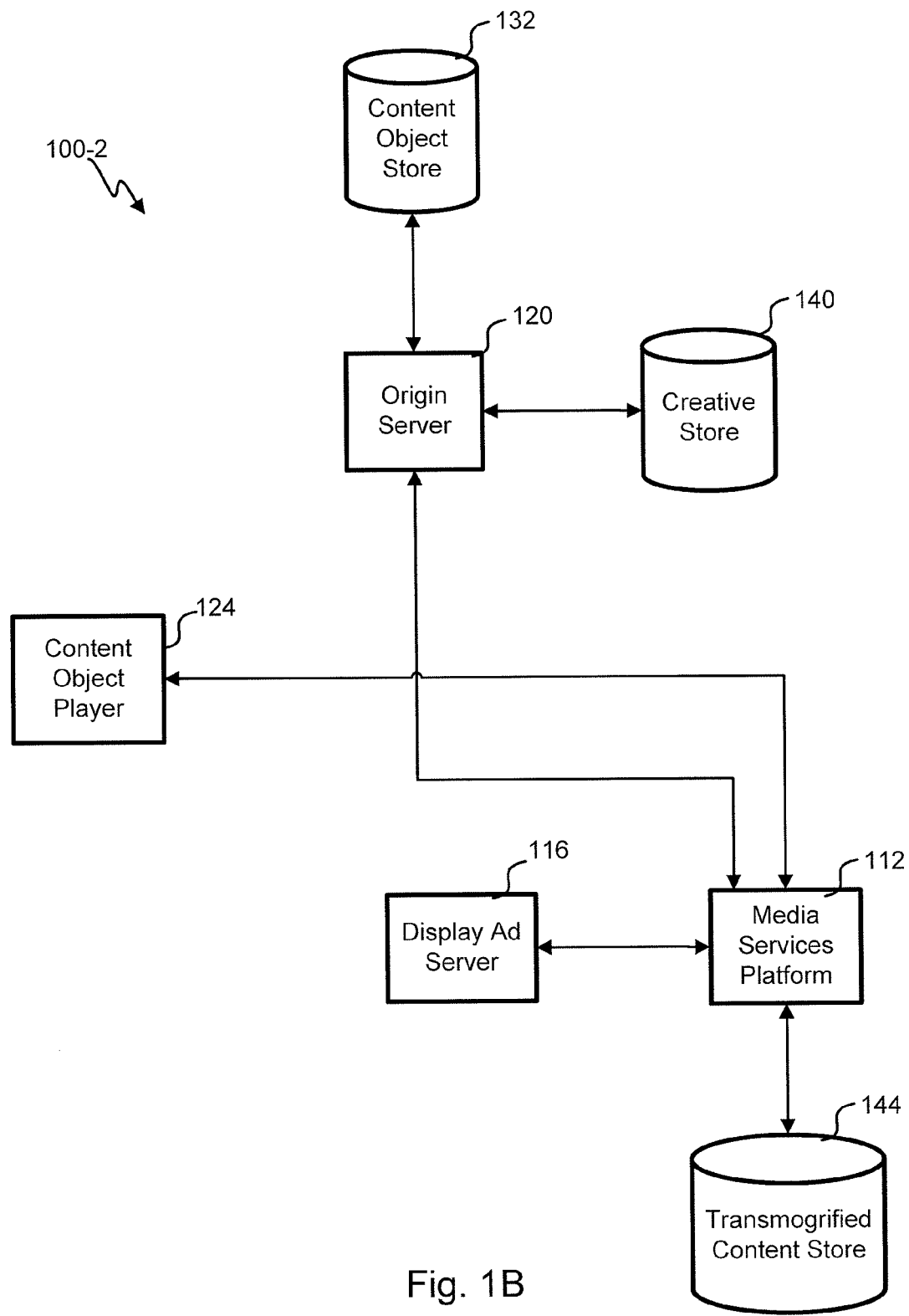

With reference to FIG. 1B, another embodiment of a content object delivery system 100-2 is shown. This embodiment does not use a CDN to assist in delivery. The content objects are downloaded by the MSP 112 from one or more origin servers 120 and transmogrified in anticipation of being requested. The in-stream ad units are specified in the ad campaign to be pre-roll, mid-roll or post-roll, or another in-stream location (e.g., 10%, 25%, 50%, 75%, or 85% complete). Rather than specifying the location to insert the in-stream ad unit as a percentage, other embodiments could specify an offset for insertion (e.g., 0, 5, 10, 15, 20, 30, 45, 50, or 60 minutes into each hour of the content object). The in-stream ad units are integrated into the content objects and stored in a transmogrified content store 144 coupled with or part of the MSP 112. There may be several versions of a particular content object with various in-stream ad units integrated in possibly different places in the content object encoded in many different ways.

The origin server 120 is located somewhere on the Internet and supplies the content objects and/or in-stream ad units to the MSP 112 through a manual or automatic process. There could be any number of origin servers 120 in various embodiments with some originating content objects and others originating in-stream ad units. This embodiment includes a content object store 132 that supplies content objects and a creative store 140 that supplies in-stream ad units through an origin server 120. When an in-stream ad campaign is designed through interaction with the DAS 116 and MSP 112, the in-stream ad units are gathered and placed into the content objects at predetermined locations in playback or slots. Various versions to support different coding for the possible attributes are also encoded. By transmogrifying in advance of user requests, requests from the content object players 124 can be fulfilled without additional delay in this embodiment.

Figure 1C:
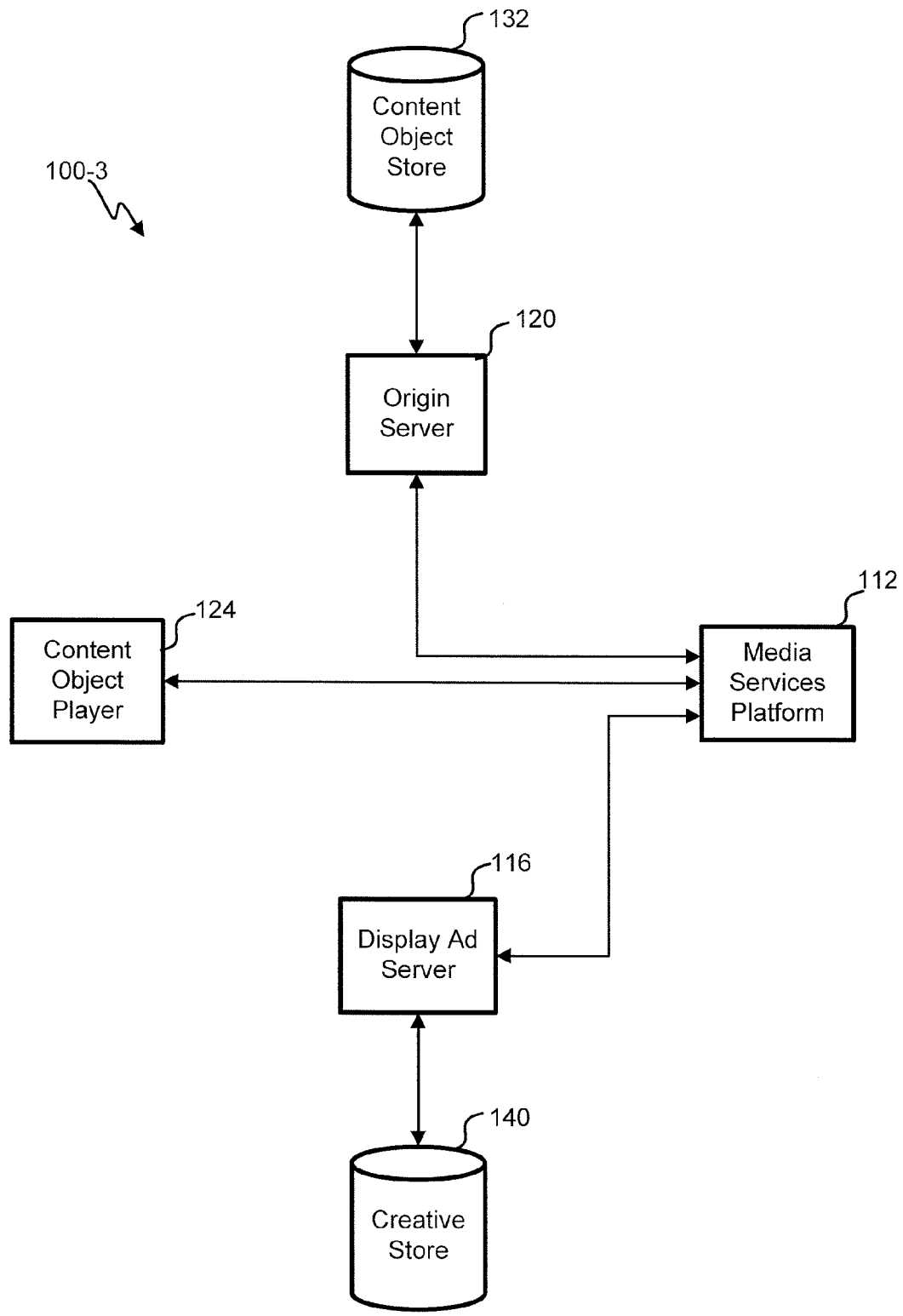

Referring next to FIG. 1C, another embodiment of a content object delivery system 100-3 is shown. This embodiment includes in the MSP 112 several other functions that accommodate real-time in-stream ad unit insertion for dynamic content object creation. Requests for content are received by the MSP 112, which queries the DAS 116 to find out which in-stream ad units to use to fill slots defined in the content object. The content object is transmogrified before returning it to the content object player 124 or as the content object is streaming to the content object player 124.

An encoding engine (not shown) is informed of the configuration of in-stream ad units and characteristics of the content object. The content object store retains a single master content object that can be transcoded to the bitrate and format for a particular request or could have multiple versions of each content object according to the different bitrates and formats. Similarly, a creative store 140 can have a single master or precoded variants for each in-stream ad unit. The encoding engine can place in-stream ad units into slots and optionally transcode on-the-fly such that the content object player 124 receives the content object with the proper in-stream ad units using the expected bitrate and format.

In this embodiment, the content object store 132 is hosted by an origin server 120 and the creative store 140 is hosted by the DAS 116, but they could be anywhere on the Internet in other embodiments. In one embodiment, a CDN 108 could be used to hold the in-stream ad units and content objects. The CDN 108 could additionally cache the content objects in their final transmogrified form with the in-stream ad units inserted. The same request for the content object configured in the same way could be served with a coded content object from the CDN without burdening resources on the MSP 112 unnecessarily.

Figure 2:
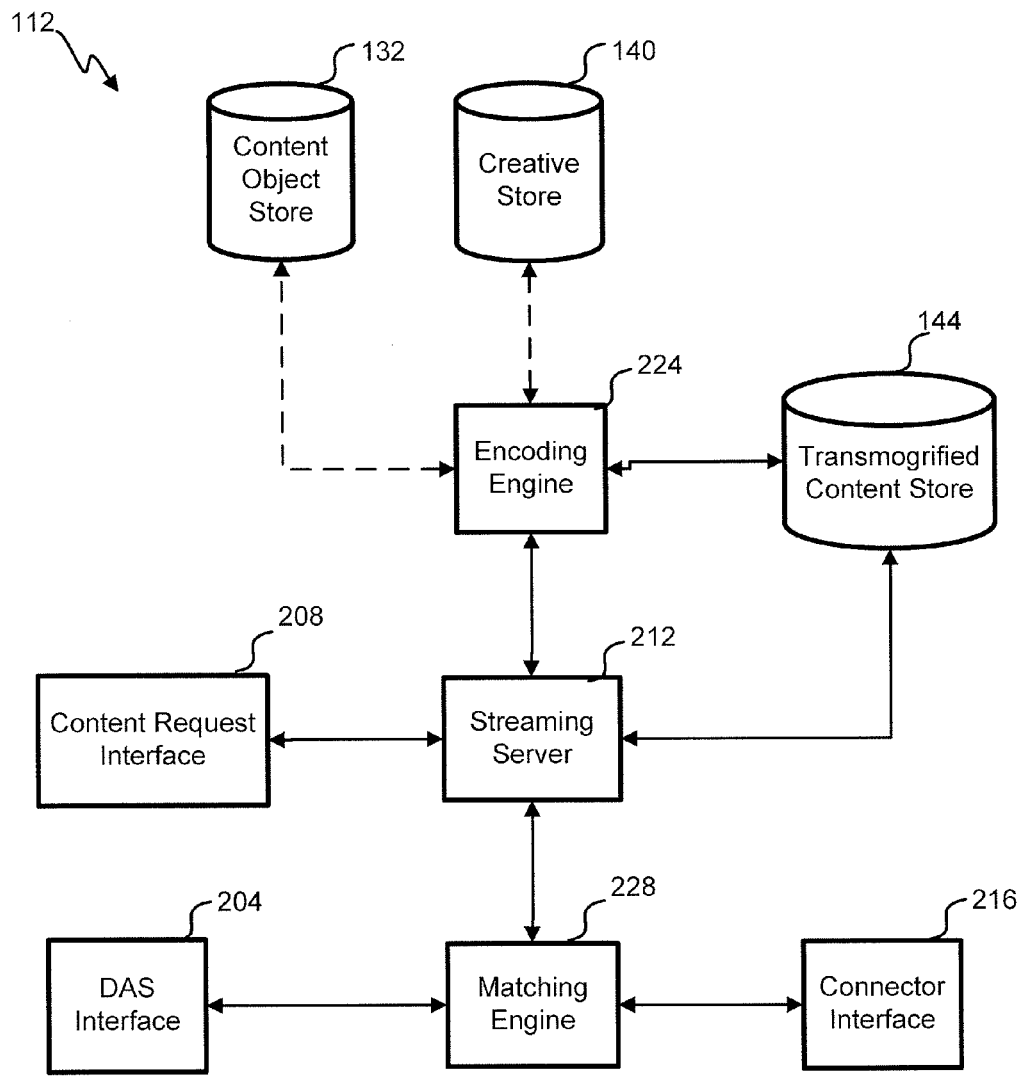
FIG. 2 depicts a block diagram of an embodiment of a media services platform (MSP)

With reference to FIG. 2, a block diagram of an embodiment of a MSP 112 is shown. The content object store 132 and creative store 140 are internal to the MSP 112 in this embodiment, but could be located within a CDN, hosted by a third-party, hosted by the DAS 116, or hosted by the content provider itself in other embodiments. Although the various blocks are shown separately, they can be implemented on one or more servers or combined in any way. The MSP 112 receives a request for a content object and performs any transmogrify before delivering the processed content object coded correctly with embedded in-stream ad units.

The DAS 116 specifies an in-stream ad unit for a particular slot that is retrieved creative store 140. The content object is held in the content object store 132 and are coded according to all the different configurations that are anticipated to be requested. For example, a particular in-stream ad unit may be inserted pre-roll, mid-roll, post-roll as the possible permutations such that three different coded content objects would be prepared and stored in the content object store 132. Pre-encoding can also be done for different content formats, bitrates and/or other parameters of the content object player 124. Additionally, there could be any number of different in-stream ad units in a particular slot resulting in still more versions of the content object.

The content objects and in-stream ad units are available to an encoding engine 136 that can transcode and insert them in-stream while streaming or downloading. Alternatively or additionally, the encoding engine 136 can precode different versions of each content object in different formats and with different in-stream ad units. When the connectors for an in-stream ad campaign are designed, the DAS 116 can be queried to determine the in-stream ad units in advance of request from content object players 124. Different content object versions to accommodate the various formats, bitrates and in-stream ad units can be created by the encoding engine 136 immediately after the content objects are identified. Where a particular configuration of coded content object is not already stored on the transmogrified content store 144, the encoding engine can code it on-the-fly as it is streamed or downloaded.

The various versions of each content object are stored in the transmogrified content store 144. Each coded content object corresponds to a different (or at least partially different) URI that might be provided to the MSP 112. The various transmogrified versions may be selected based upon information from the DAS 116, knowledge of the content object player capabilities, network conditions to the content object player 124, parameters in the URI, and the in-stream ad units selected by the DAS 116. The matching engine tells the streaming server 212 which transmogrified version to use. The transmogrified content store 144 may be hosted, mirrored and/or cached by a CDN 108 in other embodiments.

Registration of content objects is set up in several steps using the connector interface 216. Specifically, the content objects are specified through the connector interface 216 so that they can be later located typically with a URI. Additionally, categorization such as site and zone are specified for each of the content objects or for groups of content objects. Any hierarchy or categorization can be specified for content objects to provide sufficient granularity for the ad campaign designer to choose from. The mapping between in-stream slot locations within the content objects and display ad sizes is also specified in the connector interface 216. The content provider can decide the various locations within the content object that can have slots for insertion of in-stream ad units. Any location or number of commercial breaks can be accommodated for. Some slots can accommodate multiple in-stream ad units.

The matching engine 128 finds which in-stream ad units are to be inserted into the slots specified by the content provider. The slots are designed by the content provider or some other party or may be automatically specified in some embodiments. A query is made through a DAS interface 204 to the DAS 116 to find one or more in-stream ad units for a defined slot. Where there are a number of slots, there is a corresponding number of in-stream ad units or groups of in-stream ad units requested from the DAS 116. The DAS 116 is passed a display ad size and site and/or zone information for each slot. The ad campaign designer specifies the in-stream ad units to the DAS 116 for placement in specific slots and site and/zone information in a separate process. The DAS 116 plays matchmaker between slots in a content object and in-stream ad units even though the DAS 116 is not designed to supply in-stream ad units. The site and/or zone information influences the types of in-stream ad units will be placed in a particular content object.

The content object player 124 doesn't necessarily know anything about the process used to create a coded content object. Certain information may be specified by the content object player 124 to the content request interface 208 to allow choosing an appropriate format and bitrate and possibly allow better in-stream ad units to be inserted. The streaming server 212 is told the coded content object to retrieve from the transmogrified content store 144 and stream or download to the content object player 124 through the content request interface 208. In some embodiments, the content request interface 208, streaming server 212 and/or transmogrified content store 144 maybe within a CDN 108 to offload those functions from the MSP 112.

Figure 3:
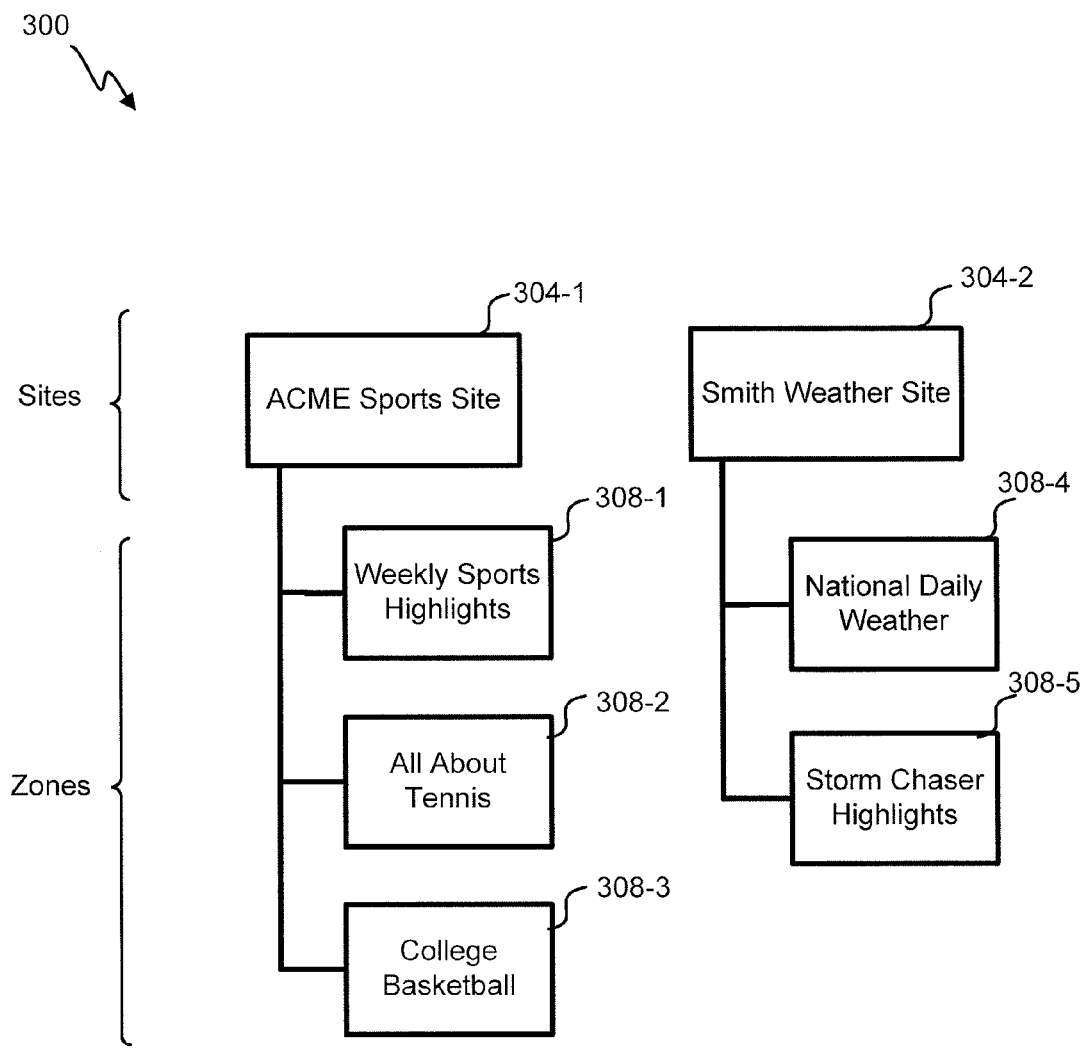
FIG. 3 depicts a diagram of an embodiment of a content characterization hierarchy.

Referring next to FIG. 3, a diagram of an embodiment of a content characterization hierarchy 300 is shown. Display ad campaigns are targeted to different web pages by the DAS 116. The possible places to run display ad units are categorized in different ways for different DASes. In this embodiment, the DAS appreciates web sites 304 that are defined by a domain and pages or group's of pages that make up a zone 308 within the site 304. In this way, a page called "all about tennis" defines a zone 308-2 where display ad units could be sold that might be attractive to viewers of that zone 308. Through site and zone, each content object or group of content objects can be categorized in a way that the ad campaign will recognize to provide an appropriate in-stream ad unit by the DAS 116. Campaign designers will specify sites and/or zones that have content objects that will be used to move their in-stream ad units.

Other embodiments could have other ways to describe or categorize a content object or groups of content objects. For example, the site 304 could specify a general category and the zone 308 specify a sub-category. For example, the XYZ News Channel could be the site 304 and the Nightly News Show be the zone 308. Granularity could be down to the individual content object, for example, the site 304 could be Nightly News Show on XYZ News Channel and the zone 308 could be today's episode. Any number of different hierarchy levels could be defined to accommodate any number of levels of sub-categorization. For example, there could be groups of similar content providers; groups of different programs; groups around a subject matter, person, event, genre, etc.; groups based upon content rating, genre, length of playback, etc. The granularity of the way in-stream ad slots might be sold through various hierarchy levels of categorization could accommodate many different embodiments in this way.

Figure 4A:
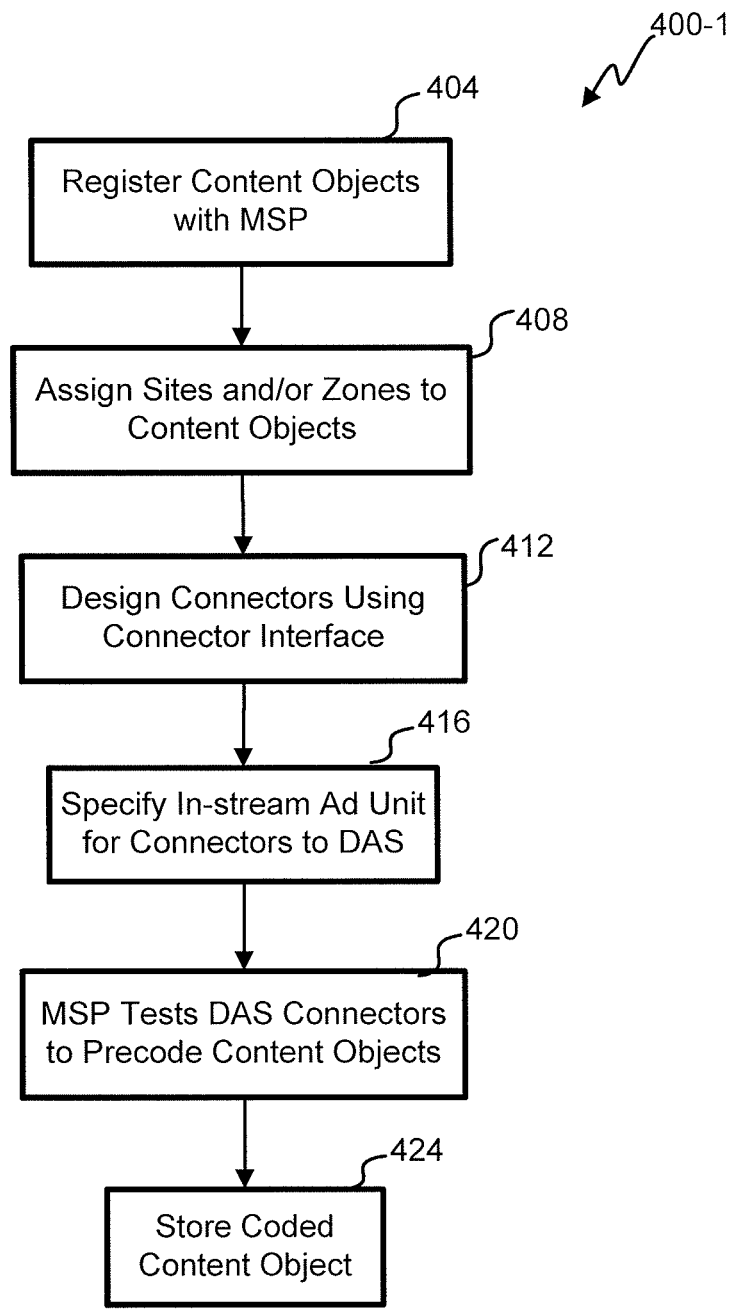
FIGS. 4A and 4B illustrate flowcharts of embodiments of a process for designing an audio and/or video ad campaign.

With reference to FIG. 4A, a flow chart of an embodiment of a process 400-1 for designing an in-stream ad campaign is shown. An ad campaign designer interacts with the DAS 116 and MSP 112 to configure an in-stream ad campaign in this embodiment. In some cases, it is the same party interacting with the DAS 116 and MSP 112, but in other cases, it is the content provider linking the content objects into the MSP 112 and an unrelated ad campaign designer seeing what content objects are available to configure the DAS 116 to fill the defined slots in the content objects. The depicted portion of the process 400-1 begins in block 404 where the content provider registers content objects MSP 112. The location where the content objects are hosted is specified to the MSP 112 which could be anywhere on the Internet, in a CDN 108 or even loaded into the MSP 112 for hosting. Some embodiments could automatically harvest the content objects by crawling specified sites.

The content objects are characterized by the content providers to allow choosing content intelligently for an in-stream ad campaign. In this embodiment, a site and/or a zone are assigned to each content object to characterize the content object in some way. In some cases, the mere location of the content object automatically characterizes the content object into site and zone. Any number of hierarchy or characterization parameters could be specified in different embodiments. Connectors are designed in block 412. A connector defines a slot within the content object that can have an in-stream ad unit inserted into. A place in the content object is chosen for the slot and a parameter that can be passed to the DAS 116 to indicate the slot. After indicating the content objects, characterizing the content objects and defining slots, the MSP 112 is ready to start filling in-stream slots and serving content objects with in-stream ad units.

In block 416, interaction with the DAS 116 begins. This part of the process could be performed by an unrelated party than the party from the preceding blocks. The DAS 116 has no appreciation of insertion of in-stream advertizing into content object, but the API to the DAS 116 is spoofed into implementing an in-stream ad campaign. The ad campaign designer is aware of the characteristics that would define individual content objects or groups of content objects. Additionally, the ad campaign designer knows the parameters that can be chosen to place in-stream ad units in different slots for content objects. In this embodiment, the parameter for the DAS 116 that defines the dimensions of a display ad is used to choose the slot in the content object. For example, a 1×5 sized display ad may correspond to a pre-roll slot for the in-stream ad unit in the content object. The ad campaign designer further defines the in-stream ad campaign specifying the characteristics of the content objects, slots to use, number of impressions, and other parameters.

In this embodiment, different versions of each content object is precoded in advance of requests. This can be performed for each permutation or just the most likely to be used. When a configuration of content object is encountered, but no precoded version exists, it could be transmogrified in real-time and saved for later requests. In block 420, the MSP 112 tests each connector for each slot for a content object to determine what the DAS 116 will specify for each slot. Once the in-stream ad units for each slot are known and gathered, a master version of the content object is created through in-stream placement of the in-stream ad units. That master version can be transcoded to support different formats and/or bitrates. The master version and the transcoded equivalents are stored in the transmogrified content store 144 in block 424. At this point, the MSP 112 is ready to serve precoded content without on-the-fly encoding.

Figure 4B:
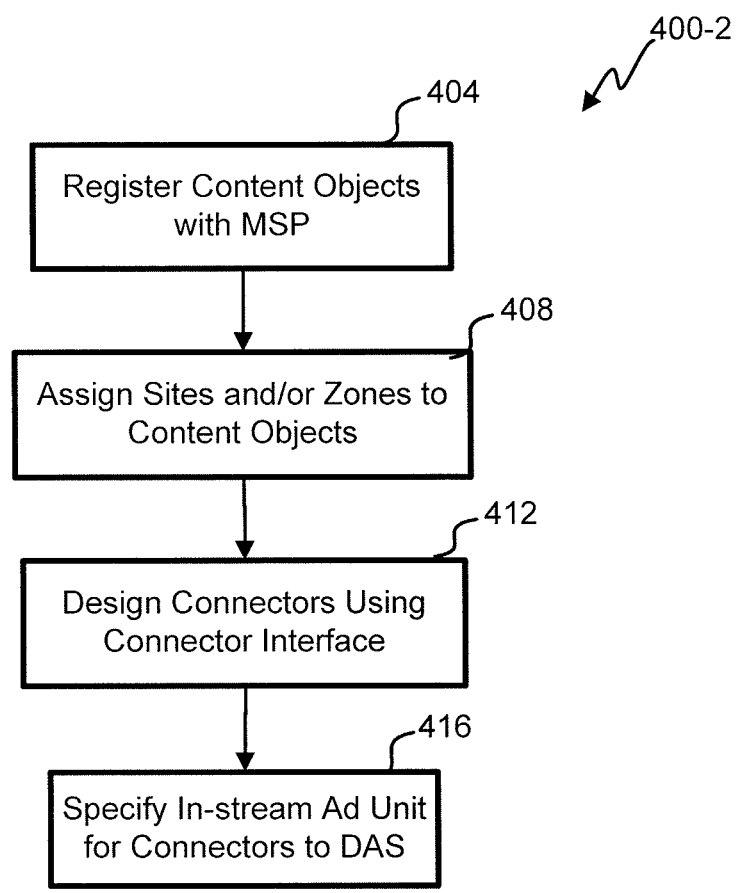

Referring next to FIG. 4B, a flow chart of another embodiment of a process 400-2 for designing an in-stream ad campaign is shown. This embodiment fills slots in the content object with in-stream ad units in real time while transcoding for the format and bitrate desired by the content object player 124. The process is generally the same as the embodiment in FIG. 4A, but block 420 and 424 are not used. The in-stream ad campaign involves specifying content objects, characterizing the content objects and defining slots with the MSP 112 before specifying the characteristics of the content objects, slots to use, number of impressions, and other parameters to the DAS 116. As each content object is requested during normal operation by a content object player 124, the coded content object is formulated and delivered. The coded content could be cached or stored to avoid encoding on-the-fly next time.

Figure 5A:
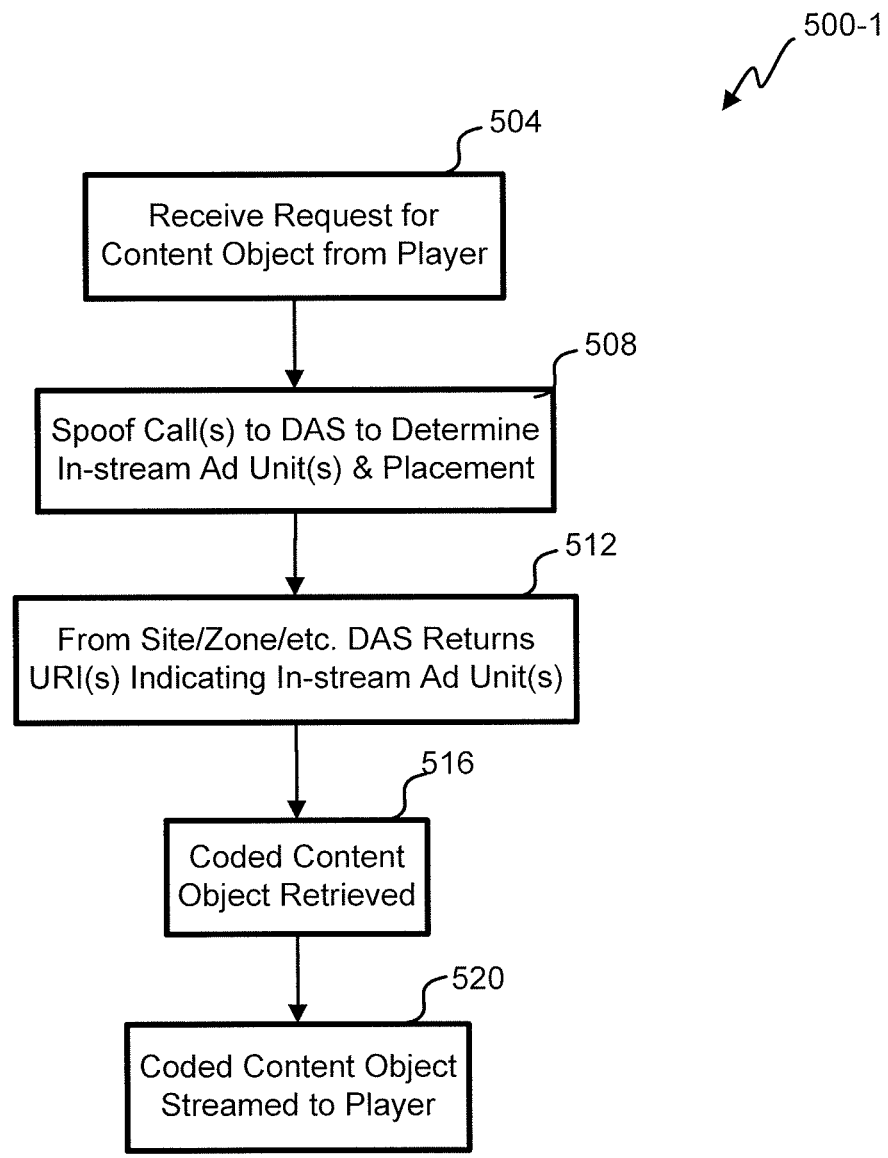
FIGS. 5A and 5B illustrate flowcharts of embodiments of a process for delivering a content object coded for a content object player with in-stream ad units inserted into the stream or download.

With reference to FIG. 5A, a flow chart of an embodiment of a process 500-1 for delivering a content object coded for a content object player 124 with in-stream ad units inserted into the stream or download is shown. This embodiment precodes and inserts in-stream ad units into the content objects, which are stored in the transmogrified content store 144 as described in relation to FIG. 4A above. The depicted portion of the process begins in block 504 where the MSP 112 receives a request for a content object. The request could be a URI or use some other API. Parameters to help characterize the requester are included in the request either in the URI, in a separate message or inferred from knowledge of the content object player 124.

This embodiment typically has the coded content objects prepared beforehand and stored by the MSP in a transmogrified content store 114. The request can be matched to a coded content object without any interaction with the DAS 116. Where there are no requests to the DAS 116, the ad campaign is not tracked by the DAS 116. Blocks 508 and 512 are performed, if for no other reason, to allow the DAS 116 to track in-stream ad placement. Other embodiments could track ad placement by query to the MSP 112 alone or the MSP 112 and DAS 116.

In block 508, the MSP 112 determines the slot(s) available in the content object for placement of an in-stream ad unit. Each slot has a separate call to the DAS 116 in this embodiment to find the appropriate in-stream ad unit. Other embodiments could have a single call to find a group of in-stream ad units for different slots in the content object. In one embodiment, multiple in-stream ad units can be used to fill a slot with a single call to the DAS 116.

In block 512, the DAS 116 receives a request for a in-stream ad unit in the form of a URI in this embodiment that spoofs the DAS 116 into specifying an in-stream ad unit and its placement in the content object. The MSP 112 further spoofs the DAS 112 into thinking the request came from the end user device. The DAS 116 receives characteristics in the form of site and/or zone along with a size of the display ad unit. With this information, the DAS 116 matches the request to a particular in-stream ad unit. The in-stream ad unit is specified by the DAS 116 in a URI that is passed back to the MSP 112. The URI indicates where the in-stream ad unit can be retrieved if not already loaded into the MSP 112.

Once the MSP 112 fills all the slots with potentially multiple calls to the DAS 116 in block 512, the MSP 112 can match the configuration of the content object to one that has been precoded and stored in the transmogrified content store 144. The coded content object is retrieved in block 516 from the transmogrified content store 144. The streaming server 212 delivers the precoded content object to the content object player in block 520.

Figure 5B:
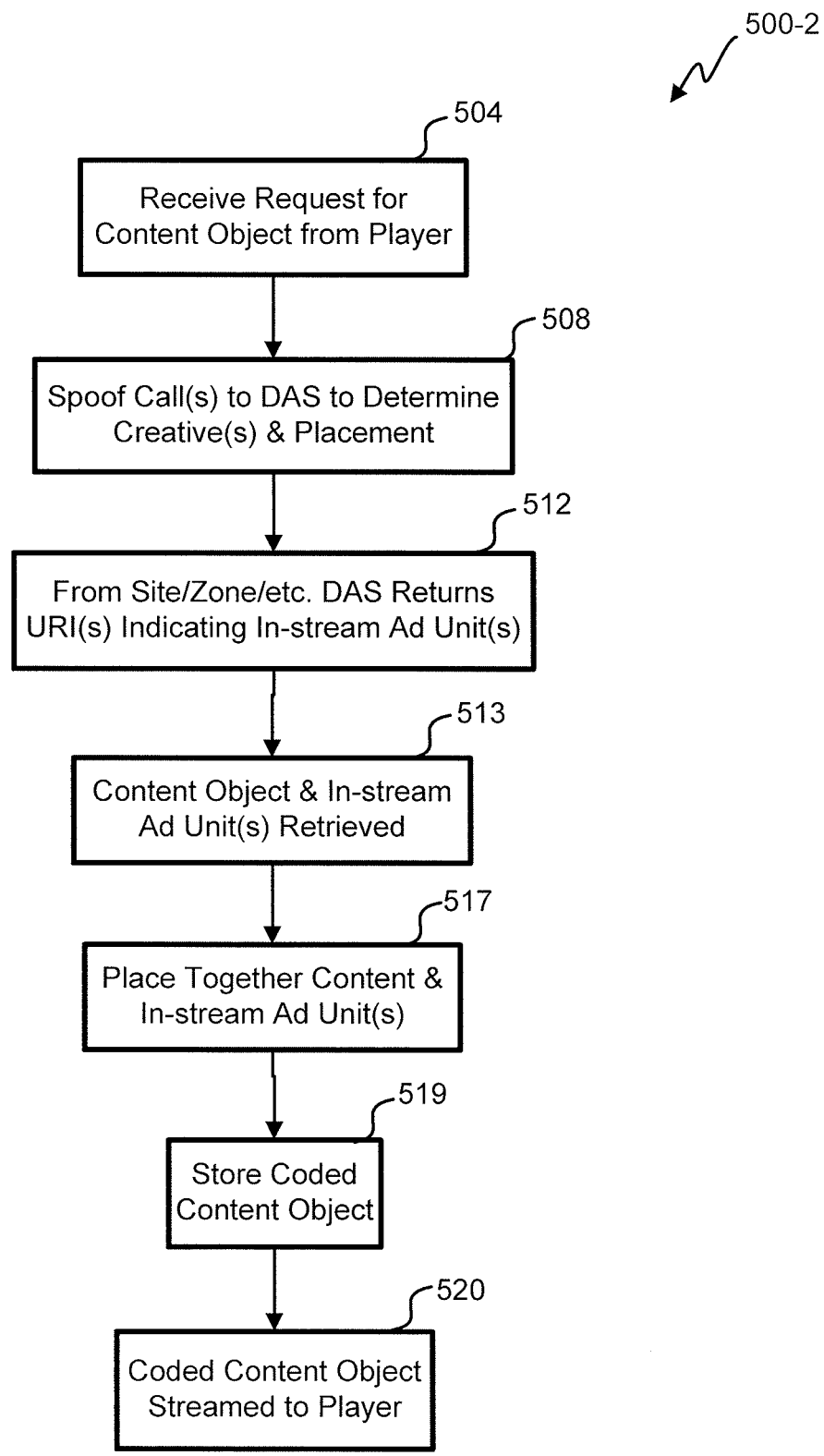

Referring next to FIG. 5B, a flow chart of an embodiment of a process 500-2 for delivering a content object coded for a content object player 124 with in-stream ad units inserted into the stream or download is shown. In this embodiment, the coded content object is created on-the-fly unless one is cached in accordance with the embodiment described in relation to FIG. 4B above. The depicted portion of the process largely mirrors the embodiment of FIG. 5A for blocks 504, 508 and 512, but inserts new blocks 513, 517 and 519 before block 520.

In block 513, the indicated in-stream ad units are retrieved from a location specified by the DAS 116 along with the content object requested by the content object player 124. In block 517, the in-stream ad units are placed into the content object along with any transcoding that might be performed to transmogrify the content object into a coded content object. The coded content object is stored in the transmogrified content store 144 in block 519. To fulfill the request, the coded content object is streamed or downloaded to the content object player 124 in block 520. Although shown as separate blocks, the creation, storage and delivery can be done at least partially simultaneously. For example, the coding and insertion can be performed as needed during the streaming of the content object. The stream is started as soon as the initial processing is performed and more processing is performed as the coded content object is spooled out to the content object player 124.

While the principles of the disclosure have been described above in connection with specific apparatuses and methods, it is to be clearly understood that this description is made only by way of example and not as limitation on the scope of the disclosure.

What is claimed is:

1. A media services platform for providing a content object with an in-stream ad unit inserted into the content object, wherein the content object is audio and/or video, the media services platform comprising:
   a computing system configured to:
   process indication of the in-stream ad unit from an ad server to insert into a slot of the content object configured for insertion of the in-stream ad unit,
   repeatedly and automatically place the in-stream ad unit into the slot of the content object to create a plurality of precoded object variants at a first location, each of the precoded object variants being associated with one or more types of content object players; and
   selecting one of the plurality of precoded object variants based on a characteristic of the content object player associated with the content request wherein the one of the plurality of precoded object variants is precoded before a content request for a content object is received; and
   a first interface configured to receive at the first location:
   the content request for the content object from the content object player, and
   location information that identifies where the content object can be retrieved;
   a second interface configured to send an ad request for the in-stream ad unit from the first location to the ad server at a second location, wherein:
   the second location is away from the first location on the Internet; and
   the selecting of the one of the plurality of precoded object variants is effected by an outcome of the ad request; and
   a third interface configured to facilitate download or streaming of the one of the plurality of precoded object variants from the first location with the in-stream ad unit placed into the slot.

2. The media services platform for providing the content object with the in-stream ad unit inserted into the content object as recited in claim 1, wherein the first interface is sub-divided into a content request interface and a connector interface.

3. The media services platform for providing the content object with the in-stream ad unit inserted into the content object as recited in claim 1, wherein:

the second interface to the ad server includes an application program interface (API) for processing display ad units, and the ad request is sent to the API.

4. The media services platform for providing the content object with the in-stream ad unit inserted into the content object as recited in claim 1, wherein the placement of the in-stream ad unit is performed before receiving the content request.

5. The media services platform for providing the content object with the in-stream ad unit inserted into the content object as recited in claim 1, wherein the computing system transcodes the content object to change at least one of a format, a sampling rate and/or a bitrate.

6. A method for providing a content object with an in-stream ad unit inserted into the content object, wherein the content object is audio and/or video and the content object has a slot configured for insertion of the in-stream ad unit, the method comprising:

sending an ad request for the in-stream ad unit from a first location to an ad server at a second location, wherein the second location is away from the first location on the Internet;

receiving an indication of the in-stream ad unit to insert into the slot from the ad server;

retrieving the in-stream ad unit;

transcoding the content object to create a plurality of precoded object variants to effect the placement of the in-stream ad unit into the slot of the content object at the first location, each of the precoded object variants being associated with one or more types of content object players;

receiving at the first location a content request for the content object from a content object player, wherein:
the content request includes location information, and
the location information:
is received at the first location, and
identifies where the content object can be requested;

selecting one of the plurality of precoded object variants based on a characteristic of the content object player associated with the content request wherein:
the one of the plurality of precoded object variants is transcoded before receiving the content request for the content object; and
the selecting of the one of the plurality of precoded object variants is effected by an outcome of the ad request; and facilitating download or streaming of the one of the plurality of precoded content objects from the first location with the in-stream ad unit placed into the slot.

7. The method for providing the content object with the in-stream ad unit inserted into the content object as recited in claim 6, wherein the ad server is spoofed into thinking the sending of the ad request is coming from an end user system.

8. The method for providing the content object with the in-stream ad unit inserted into the content object as recited in claim 6, wherein the content request from the content object player returns the one of the plurality of precoded object variants without further information beyond the request from the content object player.

9. The method for providing the content object with the in-stream ad unit inserted into the content object as recited in claim 6, further comprising receiving at the first location indication of the slot location within the content object for insertion of the in-stream ad unit.

10. The method for providing the content object with the in-stream ad unit inserted into the content object as recited in claim 6, wherein:
the ad server is a display ad server (DAS);
the DAS does not natively support in-stream ad units,
the DAS includes an application program interface (API) for providing display ads, and
the ad request is sent to the API.

11. The method for providing the content object with the in-stream ad unit inserted into the content object as recited in claim 6, further comprising transcoding the content object to change at least one of a format, a sampling rate and/or a bitrate.

12. A storage device having machine-executable instructions configured to perform the machine-implementable method for providing the content object with the in-stream ad unit inserted into the content object of claim 6.

13. A machine adapted to perform the machine-implementable method for providing the content object with the in-stream ad unit inserted into the content object of claim 6.

14. A method for providing a content object with an in-stream ad unit inserted into the content object, wherein the content object is audio and/or video and the content object has a slot configured for insertion of the in-stream ad unit, the method comprising:

processing at a first location indication of the slot within the content object for insertion of the in-stream ad unit;

sending an ad request for the in-stream ad unit from the first location to an ad server at a second location, wherein the second location is away from the first location on the Internet;

processing indication of the in-stream ad unit to insert into the slot from the ad server;

repeatedly automatically placing of the in-stream ad unit into the slot of the content object to create a plurality of precoded content variants at the first location, each of the precoded object variants being associated with one or more types of content object players;

processing at the first location a content request for the content object from a content object player;

processing location information at the first location that identifies where the content object can be retrieved;

selecting one of the plurality of precoded object variants based on a characteristic of the content object player associated with the content request, wherein:
the automatic placement of the in-stream ad unit into the slot of the content object is performed before receiving the content request; and
the selecting of the one of the plurality of precoded object variants is effected by an outcome of the ad request; and facilitating download or streaming of the one of the plurality of precoded content objects from the first location with the in-stream ad unit placed into the slot.

15. The method for providing the content object with the in-stream ad unit inserted into the content object as recited in claim 14, wherein:
the ad server includes an application program interface (API) for processing display ad units, and
the request is sent to the API.

16. The method for providing the content object with the in-stream ad unit inserted into the content object as recited in claim 14, further comprising transcoding the content object to change at least one of a format, a sampling rate and/or a bitrate.

17. A storage device having machine-executable instructions configured to perform the machine-implementable method for providing the content object with the in-stream ad unit inserted into the content object of claim 14.

18. A machine adapted to perform the machine-implementable method for providing the content object with the in-stream ad unit inserted into the content object of claim 14.

* * * * *